(12) United States Patent
El-Gamal et al.

(10) Patent No.: US 7,110,464 B2
(45) Date of Patent: Sep. 19, 2006

(54) METHOD AND SYSTEM FOR UTILIZING SPACE-TIME CODES FOR BLOCK FADING CHANNELS

(75) Inventors: Hesham El-Gamal, Dublin, OH (US); A. Roger Hammons, Jr., N. Potomac, MD (US)

(73) Assignee: The DirecTV Group, Inc., El Segundo, CA (US)

( * ) Notice: Subject to any disclaimer, the term of this patent is extended or adjusted under 35 U.S.C. 154(b) by 0 days.

(21) Appl. No.: 11/245,239

(22) Filed: Oct. 6, 2005

(65) Prior Publication Data

US 2006/0039501 A1 Feb. 23, 2006

Related U.S. Application Data

(63) Continuation of application No. 10/011,831, filed on Nov. 5, 2001.

(60) Provisional application No. 60/246,025, filed on Nov. 6, 2000.

(51) Int. Cl.
*H04B 7/02* (2006.01)
*H04L 1/02* (2006.01)

(52) U.S. Cl. ............... 375/267; 375/299; 375/347; 455/132; 455/101; 700/53

(58) Field of Classification Search ............... 375/267, 375/316, 299, 347; 455/132, 101; 700/53
See application file for complete search history.

(56) References Cited

U.S. PATENT DOCUMENTS 6,560,295 B1 5/2003 Hammons et al.
6,678,263 B1 1/2004 Hammons et al.

OTHER PUBLICATIONS

Liu, "Space-Time Coding for Broadband Wireless Communications", Jul. 2000, pp. 1-29.*

Liu, "A rank criterion for QAM space-time codes", Proceedings of the IEEE International Symposium on Information Theory 2000. Jun. 25-30, 2000 p. 314.*

Gamal, Hammos, "On the design of Space-Time Codes", Jun. 27-Jul. 2, 1999, IEEE International Workshop on Information Theory, Metsov, Greece.

Boutros, Boixadera and Lamy, "Bit-interleaved coded modulations for multiple-input multi-output channels", Sep. 6-8, 2000, 2000 IEEE Sixth International Symposium on Spread Spectrum Techniques and Applications, vol. 1, pp. 123-126.

Tarokh, Seshadri and Calderbank, "Space-time codes for high data rate wireless communication: performance criterion and code construction", Mar. 1998, IEEE Transactions on Information Theory, pp. 744-765, vol. 44, Issue 2.

Tarokh, Jafarkhani and Calderbank, "Space-time block coding for wireless communications: performance results", Mar. 1999, IEEE Journal on Selected Areas in Communications, pp. 451-460, vol. 17, Issue 3.

* cited by examiner

*Primary Examiner*—Temesghen Ghebretinsae
*Assistant Examiner*—Juan Alberto Torres
(74) *Attorney, Agent, or Firm*—Georgann S. Grunebach

(57) ABSTRACT

A communication system for transmitting encoded signals over a communication channel is disclosed. The system includes a transmitter, which has a source that is configured to output a message signal, and an encoder that is configured to generate a code word in response to the message signal. The code word is based upon a stacking construction that is generalized for the communication channel. The communication channel is characterized as a multi-input multi-output (MIMO) block fading channel. The transmitter also includes a modulator that is configured to modulate the code word for transmission over the communication channel. Further, the transmitter includes a plurality of transmit antennas that are configured to transmit the modulated code word over the communication channel. The system also includes a receiver, which has a plurality of receive antennas. The receiver is configured to receive the transmitted code word via the plurality of receive antennas.

15 Claims, 5 Drawing Sheets

METHOD AND SYSTEM FOR UTILIZING SPACE-TIME CODES FOR BLOCK FADING CHANNELS

CROSS-REFERENCES TO RELATED APPLICATION

This application is a continuation of U.S. patent application Ser. No. 10/011,831, filed Nov. 5, 2001, entitled "Method and System for Utilizing Space-Time Codes for Blocking Fading Channels". This application is related to, and claims the benefit of the earlier filing date of U.S. Provisional Patent Application Ser. No. 60/246,025, filed Nov. 6, 2000, entitled "Method and Constructions for Space-Time Codes for Block Fading Channels," the entirety of which is incorporated herein by reference.

BACKGROUND OF THE INVENTION

1. Field of the Invention

The present invention relates to coding in a communication system, and is more particularly related to space-time codes having spatial diversity and temporal diversity.

2. Discussion of the Background

Given the constant demand for higher system capacity of wireless systems, multiple antenna systems have emerged to increase system bandwidth vis-à-vis single antenna systems. In multiple antenna systems, data is parsed into multiple streams, which are simultaneously transmitted over a corresponding quantity of transmit antennas. At the receiving end, multiple receive antennas are used to reconstruct the original data stream. To combat the detrimental effects of the communication channel, communication engineers are tasked to develop channel codes that optimize system reliability and throughput in a multiple antenna system.

To minimize the effects of the communication channel, which typically is Rayleigh, space-time codes have been garnered significant attention. Rayleigh fading channels introduce noise and attenuation to such an extent that a receiver may not reliably reproduce the transmitted signal without some form of diversity; diversity provides a replica of the transmitted signal. Space-time codes are two dimensional channel codes that exploit spatial transmit diversity, whereby the receiver can reliably detect the transmitted signal. Conventional designs of space-time codes have focused on maximizing spatial diversity in quasi-static fading channels and fast fading channels. However, real communication systems exhibit channel characteristics that are somewhere between quasi-static and fast fading. Accordingly, such conventional space-time codes are not optimized.

Further, other approaches to space-time code design assume that channel state information (CSI) are available at both the transmitter and receiver. Thus, a drawback of such approaches is that the design requires the transmitter and receiver to have knowledge of the CSI, which increases implementation costs because of the need for additional hardware. Moreover, these approaches view the transmit diversity attending the use of space-time codes as a substitute for time diversity; consequently, such space-time codes are not designed to take advantage of other forms of diversity.

Based on the foregoing, there is a clear need for improved approaches for providing space-time codes that can be utilized in a multi-input multi-output (MIMO) block fading channel. There is also a need to design space-time codes that can exploit spatial diversity as well as time diversity. There is also a need to improve system reliability without reducing transmission rate. There is a further need to simplify the receiver design. Therefore, an approach for constructing space-time codes that can enhance system reliability and throughput in a multiple antenna system is highly desirable.

SUMMARY OF THE INVENTION

The present invention addresses the above stated needs by providing space-time codes to optimally exploit the spatial and temporal diversity available in the multi-input multi-output (MIMO) block fading channels.

According to one aspect of the invention, a method for transmitting encoded signals over a communication channel of a communication system is provided. The method includes receiving a message signal, and generating a code word in response to the message signal. The code word is based upon a stacking construction that is generalized for the communication channel. The communication channel is characterized as a multi-input multi-output block fading channel. Under this approach, spatial diversity and temporal diversity are enhanced, without sacrificing transmission rate.

According to another aspect of the invention, an apparatus for encoding signals for transmission over a communication channel of a communication system is provided. The apparatus comprises a source that is configured to output a message signal, and an encoder that is configured to generate a code word in response to the message signal. The code word is based upon a stacking construction that is generalized for the communication channel. The communication channel is characterized as a multi-input multi-output block fading channel. The above arrangement advantageously improves system throughput and system reliability of a communication system.

According to one aspect of the invention, an apparatus for encoding signals for transmission over a communication channel of a communication system is provided. The apparatus includes means for receiving a message signal, and means for generating a code word in response to the message signal. The code word is based upon a stacking construction that is generalized for the communication channel. The communication channel is characterized as a multi-input multi-output block fading channel. The above arrangement advantageously provides increased system capacity.

According to another aspect of the invention, a communication system for transmitting encoded signals over a communication channel is disclosed. The system includes a transmitter, which has a source that is configured to output a message signal, and an encoder that is configured to generate a code word in response to the message signal. The code word is based upon a stacking construction that is generalized for the communication channel. The communication channel is characterized as a multi-input multi-output block fading channel. The transmitter also includes a modulator that is configured to modulate the code word for transmission over the communication channel. Further, the transmitter includes a plurality of transmit antennas that are configured to transmit the modulated code word over the communication channel. The system also includes a receiver, which has a plurality of receive antennas; the receiver is configured to receive the transmitted code word via the plurality of receive antennas. The above arrangement advantageously maximizes spatial and temporal diversity.

According to another aspect of the invention, a waveform signal for transmission over a communication channel of a communication system is disclosed. The waveform signal includes a code word that is based upon a stacking construction, which is generalized for the communication channel. The communication channel is characterized as a multi-input multi-output block fading channel. The above approach minimizes data transmission errors.

In yet another aspect of the invention, a computer-readable medium carrying one or more sequences of one or more instructions for transmitting encoded signals over a communication channel of a communication system is disclosed. The one or more sequences of one or more instructions include instructions which, when executed by one or more processors, cause the one or more processors to perform the step of receiving a message signal. Another step includes generating a code word in response to the message signal. The code word is based upon a stacking construction that is generalized for the communication channel. The communication channel is characterized as a multi-input multi-output block fading channel. This approach advantageously provides simplified receiver design.

In yet another aspect of the present invention, an apparatus for receiving signals over a communication channel of a communication system is provided. The apparatus includes a demodulator that is configured to demodulate a signal containing a code word, wherein the code word being based upon a stacking construction that is generalized for the communication channel. The communication channel is characterized as a multi-input multi-output block fading channel. The apparatus also includes a decoder that is configured to decode the code word and to output a message signal. Under this approach, the effective bandwidth of the communication system is increased.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

In the following description, for the purpose of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

Although the present invention is discussed with respect to MIMO block fading channels, the present invention has applicability to communication channels with other channel characteristics.

Figure 1:
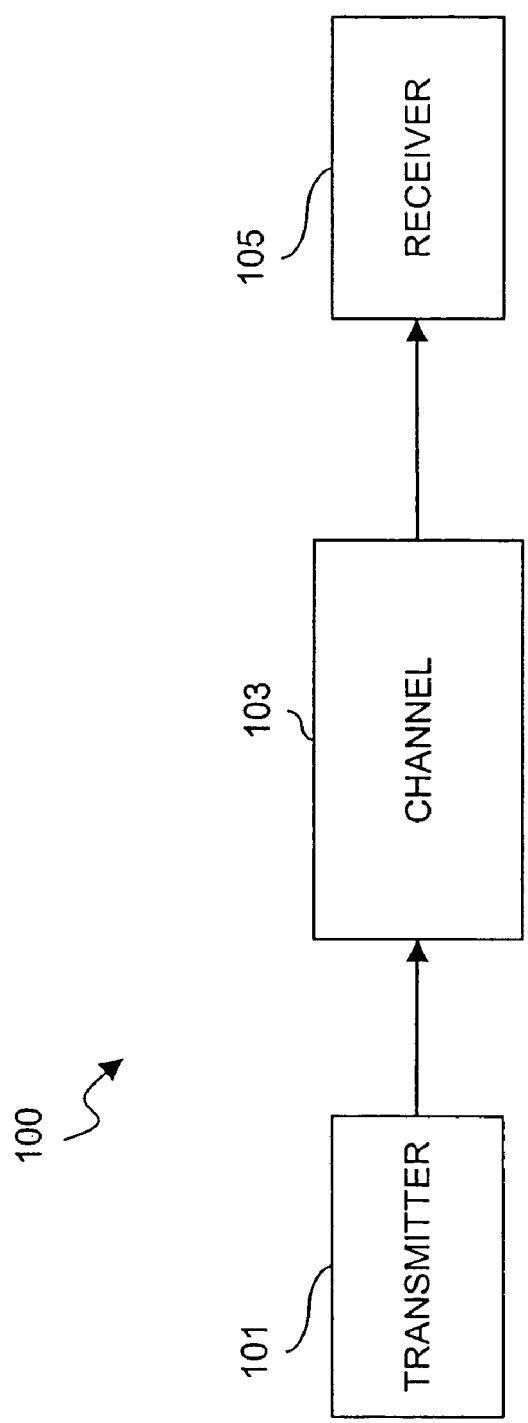
FIG. 1 is a diagram of a communication system configured to utilize space-time codes, according to an embodiment of the present invention.

FIG. 1 shows a diagram of a communication system configured to utilize space-time codes, according to an embodiment of the present invention. A digital communication system 100 includes a transmitter 101 that generates signal waveforms across a communication channel 103 to a receiver 105. In the discrete communication system 100, transmitter 101 has a message source that produces a discrete set of possible messages; each of the possible messages have a corresponding signal waveform. These signal waveforms are attenuated, or otherwise altered, by communications channel 103. As a result, receiver 105 must be able to compensate for the attenuation that is introduced by channel 103. To assist with this task, transmitter 101 employs coding to introduce redundancies that safeguard against incorrect detection of the received signal waveforms by the receiver 105.

Figure 2:
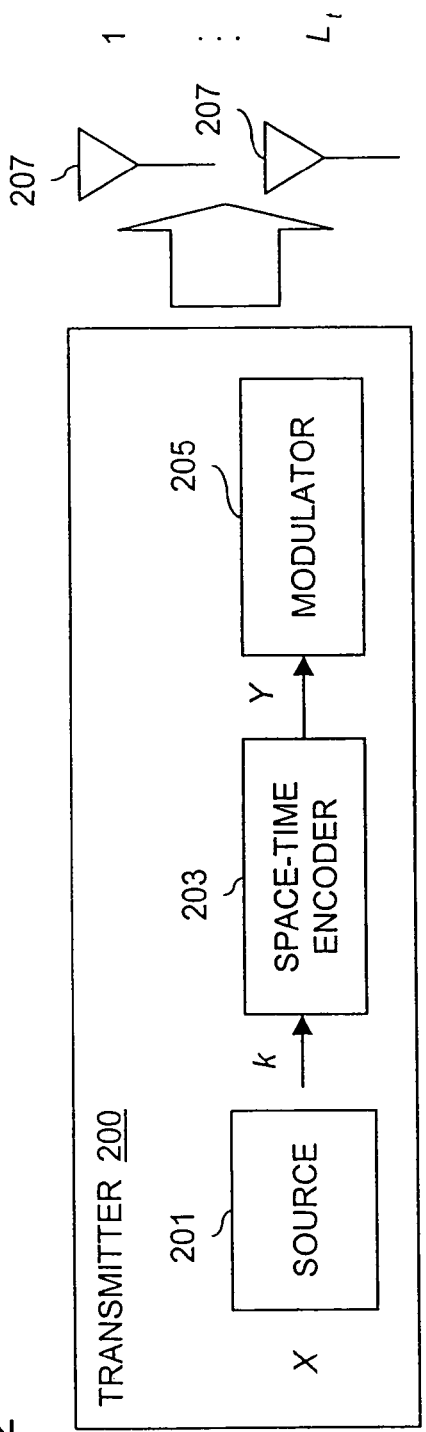
FIG. 2 is a diagram of an encoder that generates space-time codes, in accordance with an embodiment of the present invention.

FIG. 2 shows a diagram of an encoder that generates space-time codes, in accordance with an embodiment of the present invention. A transmitter 200, as mentioned above, possesses a message source 201 that generates k signals from a discrete alphabet, X. Encoder 203 then generates signals from alphabet Y to a modulator 205. Modulator 205 maps the encoded messages from encoder 203 to signal waveforms that are transmitted to $L_t$ number of antennas 207, which emit these waveforms over the communication channel 103 (as shown in FIG. 1). Accordingly, the encoded messages are segmented into $L_t$ data streams and then simultaneously transmitted over the antennas 207.

Figure 3:
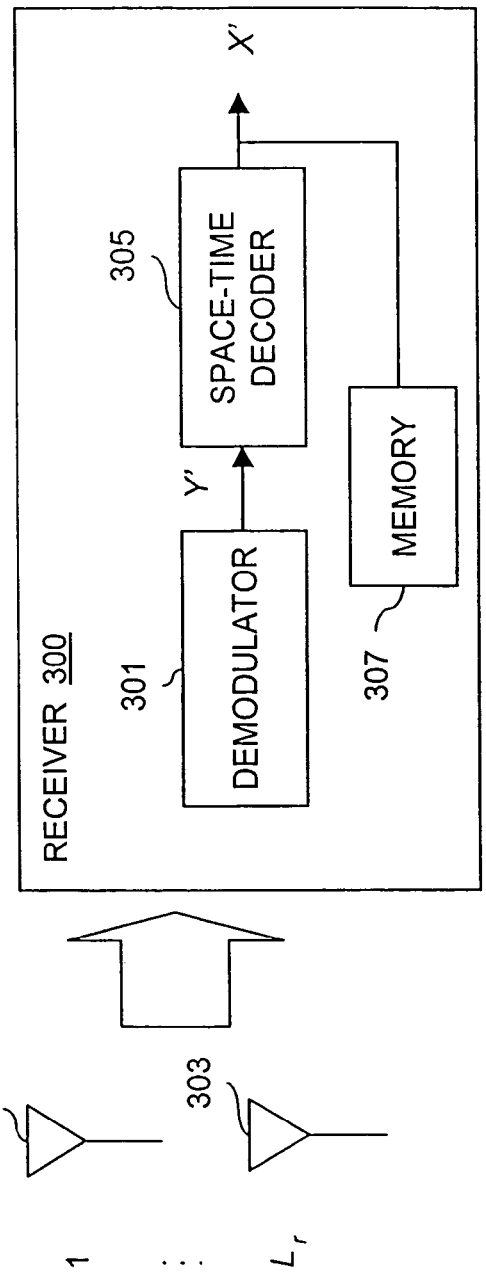
FIG. 3 is a diagram of a decoder that decodes space-time codes, according to an embodiment of the present invention.

FIG. 3 shows a diagram of a decoder that decodes space-time codes, according to an embodiment of the present invention. At the receiving side, a receiver 300 includes a demodulator 301 that performs demodulation of received signals from transmitter 200. These signals are received at multiple antennas 303. After demodulation, the received signals are forwarded to a decoder 305, which attempts to reconstruct the original source messages by generating messages, X'. Receiver 300, according to one embodiment of the present invention, has a memory 307 that stores channel state information (CSI) associated with the communication channel 103. Conventional communication systems typically require that CSI be available at both the transmitter and the receiver. By contrast, the present invention, according to one embodiment, does not require CSI at the transmitter 200, thus, providing a more robust design.

Figure 4:
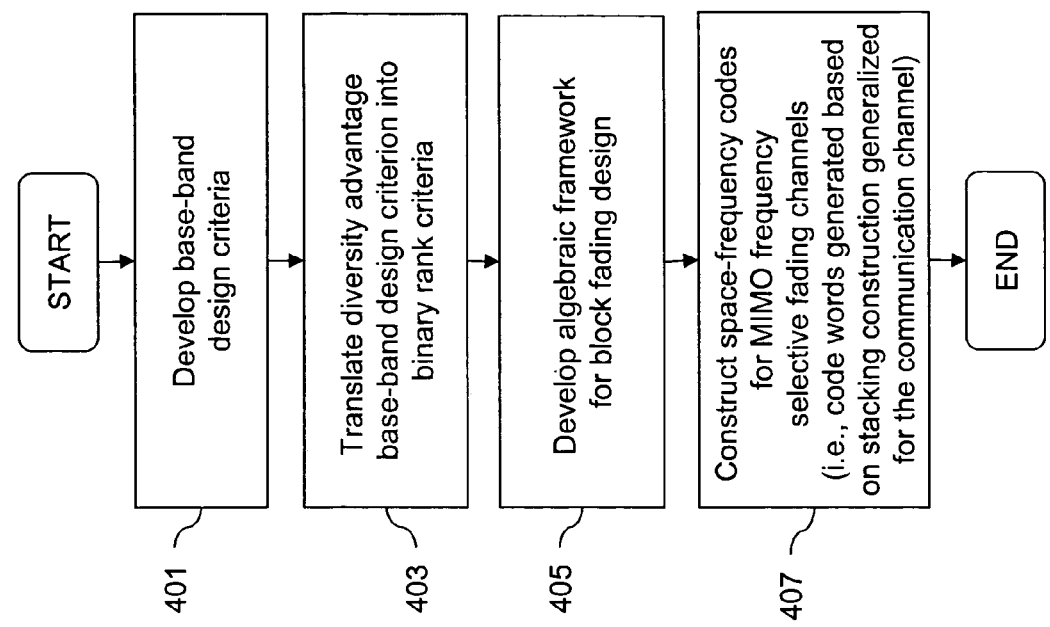
FIG. 4 is a flow chart of the process of constructing space-time codes used in the system of FIG. 1.

FIG. 4 shows a flow chart of the process of constructing space-time codes used in the system of FIG. 1. As stated previously, some research have explored the availability of multiple transmit antennas in designing channel codes that exploit spatial transmit diversity. The present invention focuses on a quasi-static fading model of the communication channel 103 in which the path gains remain fixed throughout the code word. Specifically, in the present invention, the more general block fading model is examined, based upon the quasi-static fading channel. In the present model, the code word is composed of multiple blocks. The fading coefficients are constant over one fading block but are independent from block to block. The number of fading blocks per code word can be regarded as a measure of the interleaving delay allowed in the system 100, so that systems subject to a strict delay constraint are usually characterized by a small number of independent blocks. The information theoretic capacity of multiple antenna systems 100 in block fading channels has been studied; assuming the availability of channel state information (CSI) at both the transmitter 101 and receiver 105, it is noted that antenna diversity can be a substitute for time diversity. However, this conclusion does not hold when CSI is only available at the receiver 105.

The code design of the present invention exploits both spatial and temporal diversity.

Spatial and temporal diversity can be achieved through the construction of space-time codes, as described in FIG. 4. In step 401, a baseband design criteria that determine the diversity and coding advantage achieved over block fading channels are developed. As will be more fully described, this design criteria, as in [1] [2], for quasi-static and fast fading channels are special cases of the new criteria. Then, according to step 403, the diversity advantage baseband design criterion is translated into binary rank criteria for PSK modulated codes; this approach is more fully detailed in a paper by A. R. Hammons Jr. and H. El Gamal, entitled "On the theory of space-time codes for PSK modulation" *IEEE Trans. Info. Theory*, March 2000, which is incorporated herein by reference in its entirety. Next, the binary rank criteria are then used to develop an algebraic framework for space-time code design in block fading design, per step 405. Such an algebraic framework permits construction of space-time codes that realize the optimum trade-off between diversity advantage and transmission rate for arbitrary number of transmit antennas and fading blocks (step 407). According to the present invention, the notion of universal space-time coding, which aims at constructing codes that exploit the spatial and temporal diversity when available, is described. This notion is a generalization of the smart greedy design principle proposed in [1].

In addition to its importance in the study of code design in time varying fading channels, the MIMO block fading model of communications channel 103 is beneficial in the frequency selective scenario. The developed algebraic framework is employed to construct space-frequency codes that exploit the frequency diversity available in the MIMO frequency selective fading channels.

In system 100, maximum likelihood (ML) decoding at receiver 105 is assumed. This assumption represents the case in which only a small number of receive antennas 303 (FIG. 3) are available so that the receiver signal processing capabilities are limited. In the case in which a relatively large number of receive antennas are available, more efficient signal processing techniques can be employed to separate the different transmit antenna signals. The code design criterion is different in both scenarios. The present invention develops a coding approach for systems 100 with small number of receive antennas 303.

Before discussing the construction of space-time codes of the present invention, it is instructive to discuss the concepts of space-time code design in general. First, a system model is discussed, and then the design criteria for space-time code design in quasi-static and fast fading channels, respectively, are described.

The system model, according to an embodiment of the present invention, the source 201 of transmitter 200 generates k information symbols from the discrete alphabet X, which are encoded by the error control code C via encoder 203 to produce code words of length $N=nL_t$ over the symbol alphabet Y. The encoded symbols are parsed among $L_t$ transmit antennas 207 and then mapped by the modulator into constellation points from the discrete complex-valued signaling constellation $\Omega$ for transmission across the channel 103. The modulated streams for all antennas 207 are transmitted simultaneously.

At the receiver 300, there are $L_r$ receive antennas 303 to collect the incoming transmissions. The received baseband signals are subsequently decoded by the space-time decoder 305. Each spatial channel (the link between one transmit antenna (e.g., 207) and one receive antenna (e.g., 303)) is assumed to experience statistically independent flat Rayleigh fading. Receiver noise is assumed to be AWGN (Additive White Gaussian Noise).

A space-time code is defined to include an underlying error control code together with a spatial parser. An $L_t \times n$ space-time code C of size S consists of an $(L_t n, S)$ error control code C and a spatial parser $\sigma$ that maps each code word vector $\underline{c} \in C$ to an $L_t \times n$ matrix c, whose entries are a rearrangement of those of $\underline{c}$. Except as noted to the contrary, it is assumed that the standard parser maps the following $$\underline{c} = (c_1^1, c_1^2, \ldots, c_1^{L_t}, c_2^1, c_2^2, \ldots, c_2^{L_t}, c_n^1, c_n^2, \ldots, c_n^{L_t}) \in C$$

to the matrix $$c = \begin{bmatrix} c_1^1 & c_2^1 & \cdots & c_n^1 \\ c_1^2 & c_2^2 & \cdots & c_n^2 \\ \vdots & \vdots & \ddots & \vdots \\ c_1^{L_t} & c_2^{L_t} & \cdots & c_n^{L_t} \end{bmatrix}$$

In this notation, it is understood that $c_t^i$, is the code symbol assigned to transmit antenna i (e.g., 207) at time t.

Assuming that $f: Y \to \Omega$ is the modulator mapping function, then $s=f(c)$ is the baseband version of the code word as transmitted across the channel 103. For this system, we have the following baseband model of the received signal:

$$y_t^j = \sqrt{E_s} \sum_{i=1}^{L} \alpha_t^{ij} s_t^i + n_t^j$$

where $\sqrt{E_s}$ is the energy per transmitted symbol; $\alpha_t^{ij}$ is the complex path gain from transmit antenna i (e.g., 207) to receive antenna j (e.g., 303) at time t, $s_t^i = f(c_t^i)$ is the transmitted constellation point from antenna i at time t, $n_t^j$ is the additive white Gaussian noise sample for receive antenna j at time t. The noise samples are independent samples of zero-mean complex Gaussian random variable with variance $N_0/2$ per dimension. The different path gains $\alpha_t^{ij}$ are assumed to be statistically independent.

The fading model of primary interest is that of a block flat Rayleigh fading process in which the code word encompasses M fading blocks. The complex fading gains are constant over one fading block but are independent from block to block. The quasi-static and fast fading models are special cases of the block fading model in which M=1, and M=n, respectively. For simplicity, it is assumed that M divides n.

For the quasi-static flat Rayleigh fading channel, the pairwise error probability is given by [1] [2]:

$$P(c \to e) \leq \left( \frac{1}{\prod_{i=1}^{d}(1 + \lambda_i E_S / 4N_0)} \right)^{L_r}$$

$$P(c \to e) \leq \left( \frac{\mu E_s}{4N_0} \right)^{-dL_r}$$

where $d=\text{rank}(f(c)-f(e))$ and $\mu=(\lambda_1 \lambda_2 \ldots \lambda_d)^{1/d}$ is the geometric mean of the nonzero eigen-values of $A=(f(c)-f$ (e))(f(c)−f(e))$^H$. The exponent $dL_r$ is, also referred to as the "diversity advantage," while the multiplicative factor μ is known as the "coding advantage." The parameter d is the diversity provided by the multiple transmit antennas 207.

Accordingly, the rank and equivalent product distance criteria for space-time codes in quasi-static channels [1] results. Specifically, the rank criterion specifies that the transmit diversity advantage d=rank(f(c)−f(e)) be maximized over all pairs of distinct code words c, e∈C. Further, the product distance criterion requires the maximization of the coding advantage $\mu=(\lambda_1\lambda_2 \ldots \lambda_d)^{1/d}$ over all pairs of distinct code words c, e∈C. The rank criterion is the more important of the two criteria, as it determines the asymptotic slope of the performance curve as a function of $E_s/N_0$.

The binary rank criterion for BPSK (Binary Phase-Shift Keying)-modulated, binary space-time codes are now developed. It is assumed that C is a linear $L_t×n$ space-time code with underlying binary code C of length $N=nL_t$, wherein $n>L_t$. It is also assumed that every non-zero code word c is a matrix of full rank over the binary field F. Thus, for BPSK transmission over the quasi-static fading channel, the space-time code C achieves full spatial diversity $L_tL_r$.

Using the above binary rank criterion, the following general construction for space-time codes, which is referred to as the "stacking construction" is developed. It is assumed that $M_1, M_2, \ldots, M_{L_t}$ are binary matrices of dimension k×n,n≧k, and C is a $L_t×n$ space-time code of dimension k consisting of the code word matrices $$c = \begin{bmatrix} xM_1 \\ xM_2 \\ \vdots \\ xM_{L_t} \end{bmatrix}$$

where x denotes an arbitrary k-tuple of information bits and $L_t<n$. Consequently, C satisfies the binary rank criterion, and thus, for BPSK transmission over the quasi-static fading channel, achieves full spatial diversity $L_tL_r$, if and only if $M_1, M_2, \ldots, M_{L_t}$ have the property that ∀$a_1, a_2, \ldots, a_{L_t}$∈F:

$M=a_1M_1⊕a_2M_2⊕ \ldots ⊕a_{L_t}M_{L_t}$ is of full rank k unless $a_1=a_2= \ldots =a_{L_t}=0$.

The previously described binary rank criteria and stacking construction may lift to the $Z_4$ domain, where they describe full diversity QPSK (Quadrature Phase-Shift Keying)-modulated space-time codes. The stacking construction encompasses as special cases transmit delay diversity, Tarokh's hand-crafted trellis codes [1], and certain block and concatenated coding schemes. The stacking construction is general in the number of transmit antennas 207 and applies to tail terminated trellis codes as well as block codes. The important class of rate $1/L_t$ binary convolutional codes with optimal $d_{free}$ can usually be spatially formatted to yield full diversity space-time codes.

The present invention generalizes the stacking construction in two different ways. First, a generalization is described that allows for increasing the transmission rate at the expense of minimal reduction in the diversity advantage. This construction can then be extended to block fading channels in which an objective is to optimally exploit the spatial and temporal diversity available in the channel without compromising the transmission rate.

With respect to a fast fading channel, the pairwise error probability that the decoder 305 prefers an alternate code word e to c can be upper bounded by [1]

$$P(c \to e) \leq \left( \frac{1}{\prod_{i=1}^{d}(1+|f(\bar{c}_t)-f(\bar{e}_t)|^2 E_S/4N_0)} \right)^{L_r}$$

$$P(c \to e) \leq \left( \frac{\mu E_s}{4N_0} \right)^{-dL_r}$$

where $c_i$ is the $i^{th}$ column of c, $e_t$ is the $t^{th}$ column of e, d is the number of columns $c_t$ that are different from $e_t$, and $$\mu = \left( \prod_{c_t \neq e_t} |f(\bar{c}_t) - f(\bar{e}_t)|^2 \right)^{1/d}$$

The diversity advantage is $dL_r$; and the coding advantage is μ. Thus, the fundamental design criteria [1] for space-time codes over fast fading channels are as follows. For the distance criterion, the number of column differences d=|{t: $\bar{c}_t \neq \bar{e}_t$}| over all pairs of distinct code words c, e∈C are maximized. In addition, for product criterion, the following coding advantage is maximized over all pairs of distinct code words c, e∈C:

$$\mu = \left( \prod_{c_t \neq e_t} |f(\bar{c}_t) - f(\bar{e}_t)|^2 \right)^{1/d}$$

Because real fading channels are neither quasi-static nor fast fading, but something in between, Tarokh et al. [1] suggested the ad-hoc strategy of designing space-time codes based on a combination of the quasi-static and fast fading design criteria. They refer to space-time codes designed according to the hybrid criteria as "smart greedy codes," meaning that the codes seek to exploit both spatial and temporal diversity whenever available. The present invention introduces the notion of universal space-time coding that attempts to achieve the same goal, in a systematic fashion, under the MIMO block fading model.

The present invention considers the block fading model and develops a systematic approach for designing space-time codes that achieve the maximum diversity advantage for any coding rate, number of transmit antennas 207, and temporal interleaving depth. First, the design criteria that governs the code performance in such channels are developed. The baseband design criterion is described. Under the block fading assumption, the path gains are constant over n/M consecutive symbol durations. The notation (.)[m] denotes the single or two dimensional vector of values of parameter (.) for the $m^{th}$ fading block. Accordingly, the following parameters are defined:

$\alpha^{ij}[m]=\alpha_{(m-1)n/M+1}{}^{ij}= \ldots =\alpha_{mn/M}{}^{ij}$, $Y[m]=[y_{((m-1)n/M)+1}{}^1, \ldots, y_{mn/M}{}^1, \ldots, y_{mn/M}{}^{L_r}]$, $N[m]=[n_{((m-1)n/M)+1}{}^1, \ldots, n_{mn/M}{}^1, \ldots, n_{mn/M}{}^{L_r}]$, $A[m]=[\alpha^{11}[m], \ldots, \alpha^{L_t1}[m], \ldots, \alpha^{L_tL_r}[m]]$, $c[m]=[\bar{c}_{((m-1)n/M)+1}, \ldots, \bar{c}_{mn/M}]$, For $1 \leq m \leq M$, the following expression exists:

$$\underline{Y}[m] = \sqrt{E_s} \underline{A}[m] \underline{D}_c[m] + \underline{N}[m]$$

If code word c is transmitted, then the conditional pairwise error probability that the decoder 305 will prefer the alternate code word e to c is given by the following:

$$P(c \to e | \{\alpha^{ij}\}) = P(V < 0 | \alpha^{ij}),$$

where $$V = \sum_{m=1}^{M} [\|\underline{A}[m](D_c[m] - D_e[m]) + \underline{N}[m]\|^2 - \|\underline{N}[m]\|^2]$$

is a Gaussian random variable with mean $$E\{V\} = \sum_{m=1}^{M} \|\underline{A}[m](D_c[m] - D_e[m]) + \underline{N}[m]\|^2$$

and variance $$\text{Var}\{V\} = 2N_0 E\{V\}.$$

Thus, $$P(V < 0 | \{\alpha^{ij}\}) Q = \left( \frac{\sum_{n=1}^{M} \|\underline{A}[m](D_c[m] - D_e[m])\|}{\sqrt{2N_0}} \right) \leq$$

$$\frac{1}{2} \exp\left\{ -\frac{1}{4N_0} \sum_{m=1}^{M} \|\underline{A}[m](D_c[m] - D_e[m])\|^2 \right\}$$

Accordingly, the pairwise probability of error can be manipulated to yield the fundamental bound [1] [2]:

$$P(c \to e) \leq \left( \frac{\mu E_s}{4N_0} \right)^{-dL_r}$$

where $$d = \sum_{m=1}^{M} d_m, \quad d_m = \text{rank}(f(c[m]) - f(e[m])),$$

$$\mu = \left( \prod_{m=1}^{M} \lambda_1[m] \lambda_2[m] \cdots \lambda_{d_m}[m] \right)^{1/d},$$

$\lambda_1[m], \lambda_2[m], \ldots, \lambda_{d_m}[m]$ are the nonzero eigenvalues of $\cdot A[m] = (f(c[m]) - f(e[m]))(f(c[m]) - f(e[m]))^H$. Hence, the generalized diversity and product distance criteria for space-time codes over block fading channels are as follows: for the block fading baseband rank criterion, the transmit diversity advantage $$d_m = \sum_{m=1}^{M} \text{rank}(f(c[m]) - f(e[m]))$$

over all pairs of distinct code words c, e∈C is maximized, and the block fading product distance criterion entails maximizing the coding advantage $$\mu = \left( \prod_{m=1}^{M} \lambda_1[m] \lambda_2[m] \cdots \lambda_{d_m}[m] \right)^{1/d}$$

over all pairs of distinct code words c, e∈C.

It is straightforward to observe that the design criteria for quasi-static and fast fading channels can be obtained from the block fading generalized criteria by simply letting M=1, M=n, respectively. As in the case of quasi-static fading channels, the fact that the baseband rank criterion applies to the complex-valued differences between baseband code words represents a major obstacle to the systematic design of space-time codes that achieve the maximum possible diversity advantage. It is possible to translate the baseband criterion into an equivalent binary rank criteria for BPSK and QPSK modulated space-time codes. These general binary criteria are sufficient to ensure that a space-time code achieves a certain level of diversity over block fading channels. To this end, a certain equivalence relation is imposed upon potential baseband difference matrices. Each equivalence class contains a special representative that is seen to be a binary projection of a code word whose rank over the binary field is a lower bound on the rank of any of the complex matrices in the equivalence class.

Turning now to the discussion of the BPSK binary rank criterion, for BPSK modulation, the natural discrete alphabet is the field F={0,1} of integers modulo 2. Modulation is performed by mapping the symbol x∈F to the constellation point s=f(x)∈{−1,1} according to the rule $s=(-1)^x$. It is noted that it is possible for the modulation format to include an arbitrary phase offset $e^{j\Phi}$, since a uniform rotation of the BPSK constellation will not affect the rank of the matrices f(c[m])−f(e[m])nor the eigenvalues of the matrices A[m]= (f(c[m])−f(e[m]))(f(c[m])−f(e[m]))$^H$. Notationally, the circled operator ⊕ will be used to distinguish modulo 2 addition from real- or complex-valued (+, −) operations.

Based on the above discussion, the following result for BPSK modulated codes over block fading (BF) channels is achieved. It is assumed that C is a linear $L_t \times n$ space-time code with $n \geq L_t$ used in communication system 100 with $L_t$ transmit antennas 207, $L_r$ receive antennas 303, and operating over a block fading channel 103 with M blocks per code word. Additionally, it is supposed that every non-zero binary code word c∈C has the property that d is the largest integer such that $$\sum_{m=1}^{M} \text{rank}(c[m]) \geq d,$$

where the rank is over the binary field F. Then, for BPSK transmission, the space-time code C achieves a diversity level at least as large as $dL_r$. This result stems from the fact that for any two code words c, e∈C, the following expression holds true:

$$\mathrm{rank}(f(c[m])-f(e[m])) \geq \mathrm{rank}(f(c[m]) \oplus f(e[m])),$$

where the rank in the left hand side is over the complex field and in the right hand side is over the binary field. Hence, $$\sum_{m=1}^{M} \mathrm{rank}(f(c[m]) - f(e[m])) \geq \sum_{m=1}^{M} \mathrm{rank}(f(c[m]) \oplus f(e[m]))$$

Since C is linear, then $c \oplus e \in C$ and $$\min_{c,e \in C} \sum_{m=1}^{M} \mathrm{rank}(f(c[m]) - f(e[m])) \geq \min_{c \in C} \sum_{m=1}^{M} \mathrm{rank}(c[m]).$$

As regards the QPSK binary rank criterion, in QPSK modulation, the natural discrete alphabet is the ring $Z_4=\{0, \pm 1, 2\}$ of integers modulo 4. Modulation is performed by mapping the symbol $x \in Z_4$ to the constellation point $s \in \{\pm 1, \pm i\}$ according to the rule $s=i^x$, where $i=\sqrt{-1}$. Again, the absolute phase reference of the QPSK constellation could have been chosen arbitrarily without affecting the diversity advantage or coding advantage of a $Z_4$-valued space-time code.

For the $Z_4$-valued matrix c[m], the binary-valued indicant projections are defined: $\Xi(c[m])$ and $\Psi(c[m])$. These indicant projections as defined below serve to indicate certain aspects of the binary structure of the $Z_4$ matrix in which multiples of two are ignored.

A $Z_4$-valued matrix c[m] of dimension $L_t \times n/M$ is said to be of type $1^l 2^{L_t-l}$ if it consists of exactly l rows that are not multiples of two.

It is assumed that c[m] is a $Z_4$-valued matrix of type $1^l 2^{L_t-l}$. After suitable row permutations if necessary, it has the following row structure:

$$c[m] = \begin{bmatrix} \underline{c}_1[m] \\ \vdots \\ \underline{c}_l[m] \\ 2\underline{c}'_{l+1}[m] \\ \vdots \\ 2\underline{c}'_{L_t}[m] \end{bmatrix}$$

The row-based indicant projection (Ξ-projection) is then defined as the following:

$$\Xi(c[m]) = \begin{bmatrix} \beta(\underline{c}_1[m]) \\ \vdots \\ \beta(\underline{c}_l[m]) \\ \beta(\underline{c}'_{l+1}[m]) \\ \vdots \\ \beta(\underline{c}'_{L_t}[m]) \end{bmatrix}$$

Similarly, the column-based indicant projection (Ψ-projection) is defined as $$[\Psi(c[m])]^T = \Xi(c[m]^T)$$

Using the binary indicants, we have the following result that translates the baseband rank criterion into binary rank criterion for QPSK modulated codes in a block fading environment.

With respect to the QPSK-BF binary rank criterion, it is assumed that C is a linear $L_t \times n$ space-time code over $Z_4$, with $n \geq L_t$ in communication system 100 with $L_t$ transmit antennas 207, $L_r$ receive antennas 303, and operating over a block fading channel 103 with M blocks per code word. It is further assumed that, every non-zero code word $c \in C$ has the property that d is the largest integer such that $$\sum_{m=1}^{M} \mathrm{rank}\{\Xi(c[m])\} \geq d \text{ or } \sum_{m=1}^{M} \mathrm{rank}\{\Psi(c[m])\} \geq d$$

where the rank is over the binary field F. Then, for QPSK transmission, the space-time code C achieves a diversity level at least as large as $dL_r$.

The block fading channel binary rank criteria open the door for developing an algebraic framework for constructing space-time codes that realize the optimum trade-off between transmission rate and diversity advantage. First, it is shown that the design of spec-time codes that realize full diversity is relatively easy using the multi-stacking construction in [2]. However, attaining full diversity entails a significant loss in the transmission rate compared to the quasi-static scenario, irrespective of the coding scheme used. The more challenging task, as recognized by the present invention, is to construct space-time codes that exploit the temporal diversity in a multi-input multi-output (MIMO) block fading channel without compromising the transmission rate. This coding paradigm can achieve significant increase in the diversity advantage with a relatively small number of fading blocks per code word (i.e., a small penalty in terms of interleaving delay).

The algebraic framework for BPSK space-time codes is now described. In a MIMO block fading channel 103 with $L_t$ transmit antennas 207 and M fading blocks per codeword the maximum transmit diversity is $L_tM$. Under this model, the space-time code C is defined to include the following code words $$c = \begin{bmatrix} \underline{x}M_{11} & \underline{x}M_{12} & \cdots & \underline{x}M_{1M} \\ \underline{x}M_{21} & \underline{x}M_{22} & \cdots & \underline{x}M_{2M} \\ \vdots & \vdots & \ddots & \vdots \\ \underline{x}M_{L_t1} & \underline{x}M_{L_t2} & \cdots & \underline{x}M_{L_tM} \end{bmatrix}$$

where $\underline{x} \in F^k, M_{ij} \in F^{k \times n/M}$. Full diversity is realized in this channel 103 by the following multi-stacking code construction. The space-time code C achieves full transmit diversity $L_tM$ if for every i, $1 \leq i \leq M$, the set of matrices $\{M_{1i}, M_{2i}, \ldots, M_{L_ti}\}$ satisfies the stacking construction as discussed previously.

The main disadvantage of the above multi-stacking construction is that the transmission rate is reduced to 1/M bits/sec/Hz; it is noted that in quasi-static fading channels, the stacking construction supports 1 bits/sec/Hz. This reduction in rate is not a special characteristic of the multi-stacking construction and any space-time code that achieves full diversity in the MIMO block fading channel suffers from this advantage. This fact is formalized in the following result that serves to establish the fundamental limit on the transmission rate for space-time codes with a certain level of diversity advantage in MIMO block fading channels.

The maximum transmission rate for BPSK modulation in a communication system 100 with $L_t$ transmit antennas 207, operating over a block fading channel 103 with M blocks and using a space-time code that achieves d levels of transmit diversity is $$\frac{ML_t - d + 1}{M} \text{ bits/sec/Hz.}$$

It is observed that the scenario at hand is strictly more restrictive than the case of single transmit antenna with $ML_t$ fading block—i.e., a code that achieves d levels of diversity in the MIMO block fading scenario achieves at least the same diversity order in the later scenario.

At this point, the general case of constructing codes that realize the optimum trade between the transmission rate and diversity advantage for any arbitrary transmission rate is described. The main result for space-time code design in MIMO block fading channels is obtained in two steps. First, a generalization of the stacking construction in quasi-static fading channels that allows for increasing the transmission rate at the expense of minimal reduction the diversity advantage is achieved. This important result introduces the technical machinery necessary for the second step, in which space-time codes are constructed to optimally exploit the diversity available in MIMO block fading channels.

In the first step, the previously discussed stacking construction is generalized to handle codes that achieve $d<L_t$ levels of spatial transmit diversity. These codes are capable of supporting higher transmission rates than full diversity codes. For example, with BPSK modulation and $L_t$ transmit antennas 207, a d-diversity code can support $\eta \geq 1$ bits/sec/Hz, where $L_t - d + 1 \geq \eta \geq L_t - d$, over the quasi-static fading channel. Before proceeding further, certain definitions and terminologies are presented to facilitate the discussion of the generalized stacking construction.

The BPSK space-time code under consideration C is defined as in the previously described stacking construction with the modification that n can be smaller than k to allow for higher transmission rates than 1 bits/sec/Hz. G is defined as the set of binary full rank matrices $\{G: G=\lfloor g_{i,j} \rfloor_{L_t \times L_t}\}$ resulting from applying any number of simple row operations to the identity matrix, $I_{L_t}$. Also, $\forall G \in G, \underline{x} \in F^K$, let $$Q(\underline{x}, G) = G \begin{bmatrix} \underline{x}M_1 \\ \underline{x}M_2 \\ \vdots \\ \underline{x}M_{L_t} \end{bmatrix} = [q_1^T(\underline{x}, G), q_2^T(\underline{x}, G), \ldots, q_{L_t}^T(\underline{x}, G)]^T$$

According to the BPSK binary rank criterion, for C to achieve at least r levels of diversity, the binary rank for each code word must be larger than or equal to r. A code word matrix c has a binary rank equal to r, if and only if all matrices resulting from applying any number of simple row operations to c have at least r non zero rows (i.e., the number of zero rows is less than $L_t - r + 1$). Noting that $\{Q(\underline{x}, G)\}$ is the set of matrices resulting from applying all possible combinations of simple row operations to the code word matrix corresponding to the input stream $\underline{x}$, the following condition for a space-time code achieving r levels of diversity results:

$$\forall G \in G, \underline{x} \in F^K$$

$$\lfloor q_1(\underline{x}, G), q_2(\underline{x}, G), \ldots, q_{L_t - r + 1}(\underline{x}, G) \rfloor \neq \underline{0}_{1 \times n(L_t - r + 1)}$$

Now, the following relationships are used to obtain the generalized the stacking construction:

$$q_i(\underline{x}, G) = \underline{x}[q_{i,1} I_k, q_{i,2} I_k, \ldots, q_{i,L_t} I_k] \begin{bmatrix} M_1 \\ M_2 \\ \vdots \\ M_{L_t} \end{bmatrix}$$

$$= \underline{x} R_i(G),$$

In the generalized stacking construction, C is assumed to be a linear $L_t \times n$ space-time code as defined in the previously described stacking construction with the exception that $n \leq k$ is allowed. Then, for BPSK transmission over the quasi-static fading channel, C achieves at least d levels of transmit diversity if d is the largest integer such that $\forall G \in G$, $R(G) = \lfloor R_1(G), R_2(G), \ldots, R_{L_t - d + 1}(G), \rfloor$ has a full rank k over the binary field F. It is clear that for $d = L_t$, this condition reduces to the previously described stacking construction. The above generalized stacking construction allows for a significant increase in throughput. For example, in the case of 4 transmit antennas 207, the rate can be increased from 1 bits/sec/Hz to 2 bits/sec/Hz at the expense of a small reduction in diversity advantage from 4 to 3.

The same idea behind the generalized stacking construction can be used to design space-time codes for MIMO block fading channels. First, the following notations are introduced:

$$\forall 1 \leq m \leq M, G_m = [g_{i,j}(m)] \in G, \underline{x} \in F^K, \text{ let}$$

$$Q(\underline{x}, G_m, m) = G_m \begin{bmatrix} \underline{x}M_{1m} \\ \underline{x}M_{2m} \\ \vdots \\ \underline{x}M_{L_t m} \end{bmatrix}$$

$$= [q_1^T(\underline{x}, G_m, m), q_2^T(\underline{x}, G_m, m), \ldots, q_{L_t}^T(\underline{x}, G_m, m)]^T$$

Using the block fading channel binary rank criterion and the generalized stacking construction argument, it is observed that the space-time code C achieves at least r levels of diversity if it satisfies the following condition:

$$\forall G \in G, \ldots, G_m \in G, \underline{x} \in F^K, 0 \leq m_1 \leq \min(L_t, ML_t - r + 1), \ldots, 0 \leq m_M \leq \min(L_t, ML_t - r + 1),$$

and $$\sum_{m=1}^{M} m_i = ML_t - r + 1,$$

$$[q_0(\underline{x}, G_1, 1), \ldots, q_{m_1}(\underline{x}, G_1, 1), q_0(\underline{x}, G_2, 2), \ldots, q_{m_2}(\underline{x}, G_2, 2), \ldots, q_{m_M}(\underline{x}, G_M, M)] \neq 0_{1 \times n(L_t - r + 1)}$$

where $q_0(\underline{x}, G_m, m) = [\ ]$ is an empty vector.

Again the following fact is utilized:

$$q_i(\underline{x}, G_m, m) = \underline{x}[g_{i,1}(m)I_k, g_{i,2}(m)I_k, \ldots, g_{i,L_t}(m)I_k]\begin{bmatrix} M_{1m} \\ M_{2m} \\ \vdots \\ M_{L_t m} \end{bmatrix}$$

$$= \underline{x}R_i(G_m, m),$$

for $i \geq 1$ and $R_0(G_m,m)$ is an empty matrix, to obtain the result below, which applies the generalized stacking construction to MIMO block fading channels.

In the case of a block fading generalized stacking construction, C is assumed to be a linear $L_t \times n$ space-time code. For BPSK transmission over a block fading channel 103 with M blocks, C achieves at least r levels of transmit diversity if r is the largest integer such that $$\forall G \in G, \ldots, G_m \in G, 0 \leq m_1 \leq \min(L_t, ML_t - r+1), \ldots,$$
$$0 \leq m_M \leq \min(L_t, ML_t - r+1), \text{ and}$$

$$\sum_{m=1}^{M} m_i = ML_t - r + 1,$$

$R_{m_1, \ldots, m_M}(G_1, \ldots, G_m) = [R_0(G_1), \ldots, R_{m_1}(G_1), R_0(G_2), \ldots, R_{m_2}(G_2), \ldots, R_{m_M}(G_M)]$ has a full rank k over the binary field F.

It is straightforward to note that the multi-stacking construction can be obtained by setting the diversity advantage $d = ML_t$. Further, it is interesting to compare the above condition to the threaded stacking construction for layered space-time systems.

Space-time layering is suitable for systems with relatively large number of receive antennas. The large number of receive antennas allows for the design of efficient signal processing algorithms to separate the signals from different layers efficiently, and hence code design for layered systems can assume no spatial interference for between layers. Based on this assumption, it is observed that the layered space-time code needs to satisfy the above condition when every $\forall G_m$ is a permutation of the identity matrix. This relaxed constraint constitute the base for the framework for layered space-time coding. For example, the present invention according to one embodiment, considers use of a relatively smaller number of receive antennas 303 than the number of transmit antennas 207, thereby limiting the ability to separate the different transmit antenna signals. Hence, the burden now lays on the code design to account for the fact that the input to the maximum likelihood decoder 305 is the sum of the different transmit antenna signals multiplied with the corresponding fading coefficients.

The block fading generalized stacking construction permits construction of space-time codes that optimally exploit the diversity available in MIMO block fading channels with arbitrary number of transmit antennas 207 and fading blocks per code word. The special case of designing space-time convolutional codes for this scenario is now described. Such codes advantageously enables the use of computationally efficient maximum likelihood decoders (e.g., 305).

The natural space-time codes associated with binary rate $1/ML_t$ convolutional codes with periodic bit interleaving are attractive candidates for the application under consideration in the present invention, as they can be easily formatted to satisfy the multi-stacking condition, and hence achieve full diversity. Each output arm from the encoder 203 is assigned to a distinct pair of transmit antenna 207 and fading block.

The next step is to consider the more challenging task of finding rate $k/ML_t$ codes that achieve the best trade-off between throughput and diversity advantage for arbitrary choice of the transmission throughput. It is assumed that C is a binary convolutional code of rate $k/ML_t$. The encoder 203 processes k binary input sequences $x_1(t), x_2(t), \ldots, x_k(t)$ and produces $ML_t$ coded output sequences $y_1(t), y_2(t), \ldots, y_{ML_t}(t)$ which are multiplexed together to form the output code word. A sequence $\{x(t)\}$ is often represented by the formal series $X(D) = x(0) + x(1)D + x(2)D^2 + \ldots$ $\{x(t)\} \leftrightarrow X(D)$ is referred to as a D-transform pair. The action of the binary-convolutional encoder 203 is linear and is characterized by the so-called impulse responses $g_{i,1}(t) \leftrightarrow G_{i,j}(D)$ associating output $y_i(t)$ with input $x_i(t)$. Thus, the encoder 203 action is summarized by the matrix equation:

$$Y(D) = X(D)G(D),$$

where $Y(D) = [Y_1(D)Y_2(D) \ldots Y_{ML_t}(D)]$, $X(D) = [X_1(D)X_2(D) \ldots X_k(D)]$, and $$G(D) = \begin{bmatrix} G_{1,1}(D) & G_{1,2}(D) & \cdots & G_{1,ML_t}(D) \\ G_{2,1}(D) & G_{2,2}(D) & \cdots & G_{1,ML_t}(D) \\ \vdots & \vdots & \ddots & \vdots \\ G_{k,1}(D) & G_{k,2}(D) & \cdots & G_{k,ML_t}(D) \end{bmatrix}$$

The natural space-time formatting of C is considered, whereby the output sequence corresponding to $Y_{(m-1)L_t+l}(D)$ is assigned to the $l^{th}$ transmit antenna 207 in the $m^{th}$ fading block, such that the diversity that can be achieved by this scheme can be characterized. The algebraic analysis technique considers the rank of matrices formed by concatenating linear combinations of the column vectors:

$$F_l(D) = \begin{bmatrix} G_{1,l}(D) \\ G_{2,l}(D) \\ \vdots \\ G_{k,l}(D) \end{bmatrix} \quad (15)$$

Using the same approach as in the block fading generalized stacking construction, the following is defined $\forall G_m \in G$, $1 \leq i \leq L_t$, $1 \leq m \leq M$ $$R_i^{(G_m,m)}(D) = \quad (16)$$

$$[g_{i,1}(m)I_k, g_{i,2}(m)I_k, \ldots, g_{i,L_t}(m)t_k] \begin{bmatrix} F_{(m-1)L_t+1}(D) \\ F_{(m-1)L_t+2}(D) \\ \vdots \\ F_{mL_t}(D) \end{bmatrix}$$

An algebraic framework for designing BPSK space-time convolutional codes is now established. In a communication system 100 with $L_t$ transmit antennas 207 operating over a block fading channel 103 with M blocks, C denotes the space-time code that includes the binary convolutional code C, whose k×ML$_t$ transfer function matrix is G(D)=[F$_1$(D) ... F$_{ML_t}$(D)] and the spatial parser σ in which the output Y$_{(m-1)L_t+l}$(D)=X(D)F$_{(m-1)L_t+l}$(D) is assigned to antenna l in fading block m. Then, for BPSK transmission, C achieves d levels of transmit diversity if d is the largest integer such that $$\forall G_1 \in G, \ldots, G_M \in G, \, 0 \leq m_1 \leq \min(L_p ML_t-d+1), \ldots, 0 \leq m_M \leq \min(L_p ML_t-r+1),$$

and $\sum_{m=1}^{M} m_i = ML_t - d + 1$, $$R_{m_1,\ldots,m_M}^{(G_1,\ldots,G_M)}(D)=[R_0^{(G_1,1)}(D),\ldots,R_{m_1}^{(G_1,1)}(D), R_0^{(G_2,2)}(D),\ldots,R_{m_2}^{(G_2,2)}(D),\ldots, R_{m_M}^{(G_M,M)}(D)]$$

has a rank k over the space of all formal series.

The above result is utilized to construct convolutional space-time codes that realize the optimum tradeoff between transmission rate and diversity order for BPSK modulation with arbitrary coding rate, number of transmit antennas 207, and number of fading blocks. It can be easily seen that this framework encompasses as special case rate 1/n' convolutional codes with bit or symbol interleaving across the transmit antennas and fading blocks.

The binary constructions previously proposed for BPSK modulation can also be used to construct codes for higher order constellations. For QPSK modulation, linear $Z_4$ codes can be constructed by "lifting" linear binary codes to the $Z_4$ alphabet (i.e., the binary projection of the $Z_4$ code generator matrix is the same as the binary generator matrix). Another way for designing codes for QPSK modulation is to combine two binary codes A, B with the same diversity advantage in a dyadic format C=A+2B. The resulting $Z_4$ code achieves the same diversity advantage as the binary code, however, for QPSK transmission.

The present invention considers the design of space-time codes for MIMO block fading channels. The developed baseband design criteria determines the diversity and coding advantage achieved by space-time codes in block fading channels. For BPSK and QPSK modulated codes, the developed binary rank criteria allow for designing space-time codes that exhibit the optimum diversity-vs.- throughput tradeoff. These binary criteria are then utilized to develop general algebraic framework for space-time code design in MIMO block fading channels. The above construct has applicability in a number of communication systems; for example, the space-time codes can be deployed in a wireless communication, as seen in FIG. 5.

Figure 5:
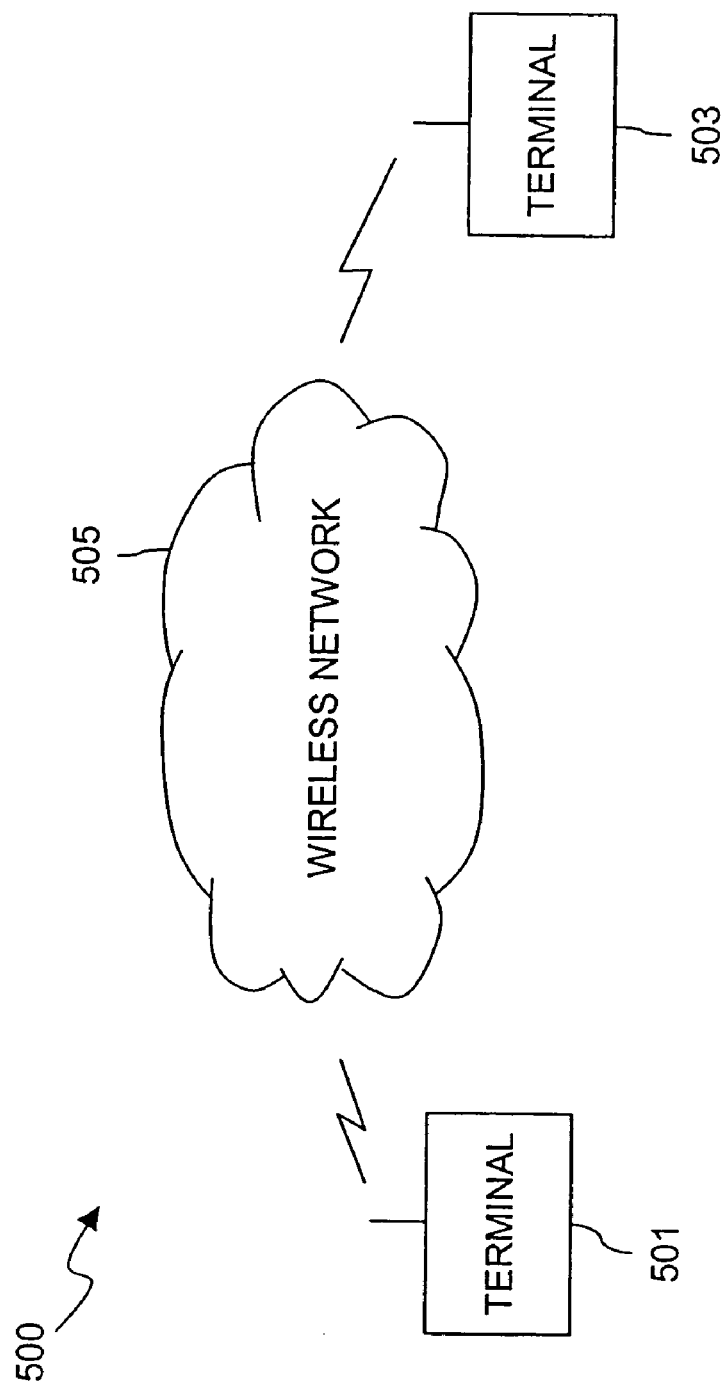
FIG. 5 is a diagram of a wireless communication system employing the space-time codes, according to an embodiment of the present invention.

FIG. 5 shows a diagram of a wireless communication system that utilizes space-time codes, according to an embodiment of the present invention. In a wireless communication system 500, multiple terminals 501 and 503 communicate over a wireless network 505. Terminal 501 is equipped with a space-time encoder 203 (as shown in FIG. 2) that generates space-time codes with a block fading generalized stacking construction. Terminal 501 also includes multiple transmit antennas 207 (as shown in FIG. 2). In this example, each of the terminals 501 and 503 are configured to encode and decode the space-time codes; accordingly, both of the terminals 501 and 503 possess the transmitter 200 and receiver 300. However, it is recognized that each of the terminals 501 and 503 may alternatively be configured as a transmitting unit or a receiving unit, depending on the application. For example, in a broadcast application, terminal 501 may be used as a head-end to transmit signals to multiple receiving terminals (in which only receiving terminal 503 is shown). Consequently, terminal 503 would only be equipped with a receiver 300. The space-time code construction of the present invention advantageously permits use of a smaller number of receive antennas than that of the transmitting terminal 501, thereby resulting in hardware cost reduction. In an exemplary embodiment, a terminal that is designated as a receiving unit may possess a smaller quantity of antennas that of the transmitting unit.

Figure 6:
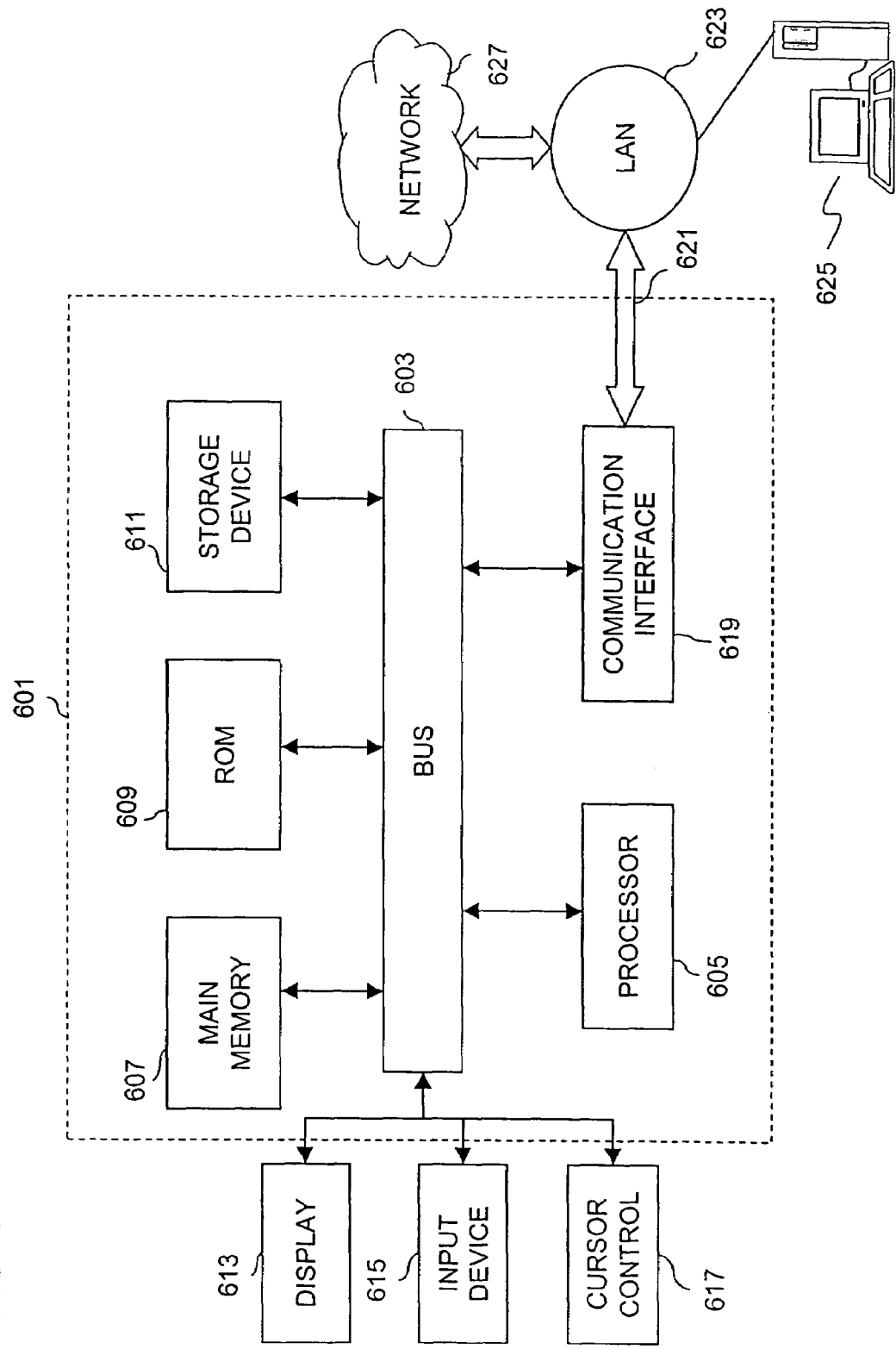
FIG. 6 is a diagram of a computer system that can perform the processes of encoding and decoding of space-time codes, in accordance with an embodiment of the present invention.

FIG. 6 shows a diagram of a computer system that can perform the processes of encoding and decoding of space-time codes, in accordance with an embodiment of the present invention. Computer system 601 includes a bus 603 or other communication mechanism for communicating information, and a processor 605 coupled with bus 603 for processing the information. Computer system 601 also includes a main memory 607, such as a random access memory (RAM) or other dynamic storage device, coupled to bus 603 for storing information and instructions to be executed by processor 605. In addition, main memory 607 may be used for storing temporary variables or other intermediate information during execution of instructions to be executed by processor 605. Computer system 601 further includes a read only memory (ROM) 609 or other static storage device coupled to bus 603 for storing static information and instructions for processor 605. A storage device 611, such as a magnetic disk or optical disk, is provided and coupled to bus 603 for storing information and instructions.

Computer system 601 may be coupled via bus 603 to a display 613, such as a cathode ray tube (CRT), for displaying information to a computer user. An input device 615, including alphanumeric and other keys, is coupled to bus 603 for communicating information and command selections to processor 605. Another type of user input device is cursor control 617, such as a mouse, a trackball, or cursor direction keys for communicating direction information and command selections to processor 605 and for controlling cursor movement on display 613.

According to one embodiment, channel code generation within system 100 is provided by computer system 601 in response to processor 605 executing one or more sequences of one or more instructions contained in main memory 607. Such instructions may be read into main memory 607 from another computer-readable medium, such as storage device 611. Execution of the sequences of instructions contained in main memory 607 causes processor 605 to perform the process steps described herein. One or more processors in a multi-processing arrangement may also be employed to execute the sequences of instructions contained in main memory 607. In alternative embodiments, hard-wired circuitry may be used in place of or in combination with software instructions. Thus, embodiments are not limited to any specific combination of hardware circuitry and software.

Further, the instructions to support the generation of space-time codes of system 100 may reside on a computer-readable medium. The term "computer-readable medium" as used herein refers to any medium that participates in providing instructions to processor 605 for execution. Such a medium may take many forms, including but not limited to, non-volatile media, volatile media, and transmission media. Non-volatile media includes, for example, optical or magnetic disks, such as storage device 611. Volatile media includes dynamic memory, such as main memory 607. Transmission media includes coaxial cables, copper wire and fiber optics, including the wires that comprise bus 603.

Transmission media can also take the form of acoustic or light waves, such as those generated during radio wave and infrared data communication.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 605 for execution. For example, the instructions may initially be carried on a magnetic disk of a remote computer. The remote computer can load the instructions relating to encoding and decoding of space-time codes used in system 100 remotely into its dynamic memory and send the instructions over a telephone line using a modem. A modem local to computer system 601 can receive the data on the telephone line and use an infrared transmitter to convert the data to an infrared signal. An infrared detector coupled to bus 603 can receive the data carried in the infrared signal and place the data on bus 603. Bus 603 carries the data to main memory 607, from which processor 605 retrieves and executes the instructions. The instructions received by main memory 607 may optionally be stored on storage device 611 either before or after execution by processor 605.

Computer system 601 also includes a communication interface 619 coupled to bus 603. Communication interface 619 provides a two-way data communication coupling to a network link 621 that is connected to a local network 623. For example, communication interface 619 may be a network interface card to attach to any packet switched local area network (LAN). As another example, communication interface 619 may be an asymmetrical digital subscriber line (ADSL) card, an integrated services digital network (ISDN) card or a modem to provide a data communication connection to a corresponding type of telephone line. Wireless links may also be implemented. In any such implementation, communication interface 619 sends and receives electrical, electromagnetic or optical signals that carry digital data streams representing various types of information.

Network link 621 typically provides data communication through one or more networks to other data devices. For example, network link 621 may provide a connection through local network 623 to a host computer 625 or to data equipment operated by a service provider, which provides data communication services through a communication network 627 (e.g., the Internet). LAN 623 and network 627 both use electrical, electromagnetic or optical signals that carry digital data streams. The signals through the various networks and the signals on network link 621 and through communication interface 619, which carry the digital data to and from computer system 601, are exemplary forms of carrier waves transporting the information. Computer system 601 can transmit notifications and receive data, including program code, through the network(s), network link 621 and communication interface 619.

The techniques described herein provide several advantages over prior approaches to providing space-time codes for MIMO block fading channels. Such code construction enhances spatial and temporal diversity without sacrificing transmission rate.

Obviously, numerous modifications and variations of the present invention are possible in light of the above teachings. It is therefore to be understood that within the scope of the appended claims, the invention may be practiced otherwise than as specifically described herein.

REFERENCES

[1] V. Tarokh, N. Seshadri, and A. R. Calderbank. Space-time codes for high data rate wireless communication: Performance criterion and code construction. *IEEE Trans. Info. Theory*, IT-44:774–765, March 1998.

[2] J.-C. Guey, M. R. Bell M. P. Fitz, and W.-Y. Kuo. Signal design for transmitter diversity wireless communication systems over Rayleigh fading channels. *IEEE Vehicular Technology Conference*, pages 136–140, Atlanta, 1996.

[3] E. Biglieri, G. Caire, and G. Taricco. Limiting performance for block-fading channels with multiple antennas, submitted to *IEEE Trans. Info. Theory*, September 1999.

What is claimed is:

1. A method for generating space-time codes, the method comprising:

computing a baseband design criteria for determining a diversity advantage and a coding advantage achieved over block fading channels;

translating the baseband design criteria into a binary rank criteria for modulated codes corresponding to the space-time codes; and outputting the space-time codes according an algebraic framework derived from the binary rank criteria, wherein the binary rank criteria specifies that for every non-zero code word c∈C, $$\sum_{m=1}^{M} \text{rank}(c[m]) \geq d,$$

the rank is over a binary field F and d is the largest possible integer, the space-time code C achieving a diversity level of at least $dL_r$, $L_r$ being the number of the plurality of receive antennas, m representing the number of blocks per code word.

2. A method according to claim 1, wherein the transmit diversity advantage is as follows:

$$d_m = \sum_{m=1}^{M} \text{rank}(f(c[m]) - f(e[m]))$$

over all pairs of distinct code words c, e∈C, m representing a fading block.

3. A method according to claim 1, wherein the coding advantage is as follows:

$$\mu = \left( \prod_{m=1}^{M} \lambda_1[m]\lambda_2[m] \cdots \lambda_{d_m}[m] \right)^{1/d}$$

over all pairs of distinct code words c, e∈C, m representing a fading block, $\lambda_1[m]\lambda_2[m] \ldots \lambda_{d_m}[m]$ being nonzero eigenvalues of $(f(c[m])-f(e[m]))(f(c[m])-(e[m]))^H$.

4. A method according to claim 1, wherein the algebraic framework specifies C as a linear $L_t \times n$ space-time code, the space-time code being of dimension k including code word matrices, $$c = \begin{bmatrix} xM_1 \\ xM_2 \\ \vdots \\ xM_{L_t} \end{bmatrix}$$

wherein x denotes an arbitrary k-tuple of information bits and $n \geq L_t$, $M_1$, $M_2$, ..., $M_{L_t}$ are binary matrices of dimension $k \times n$, $n \leq k$, and $L_t$ represents the number of transmit antennas in the communication system.

5. A method according to claim 4, wherein $M_1$, $M_2$, ..., $M_{L_t}$ has the following property, ∀$a_1, a_2, \ldots, a_{L_t} \in F$:

$M = a_1 M_1 \oplus a_2 M_2 \oplus \ldots \oplus a_{L_t} M_{L_t}$ is of full rank k unless $a_1 = a_2 = \ldots = a_{L_t} = 0$.

6. A method for generating space-time codes, the method comprising:
computing a baseband design criteria for determining a diversity advantage and a coding advantage achieved over block fading channels;
translating the baseband design criteria into a binary rank criteria for modulated codes corresponding to the space-time codes; and
outputting the space-time codes according an algebraic framework derived from the binary rank criteria, wherein the binary rank criteria specifies for every non-zero code word $c \in C$, at least one of $$\sum_{m=1}^{M} \text{rank}\{\Xi(c[m])\} \geq d, \text{ and } \sum_{m=1}^{M} \text{rank}\{\Psi(c[m])\} \geq d$$

holds true, wherein the rank is over a binary field and d is the largest possible integer, $\Xi$ being a row-based indicant projection, $\Psi$ being a column-based indicant projection, the space-time code C achieving a diversity level of at least $dL_r$, $L_r$ being the number of the plurality of receive antennas, m representing the number of blocks per code word.

7. An apparatus for generating space-time codes, the apparatus comprising:
means for computing a baseband design criteria for determining a diversity advantage and a coding advantage achieved over block fading channels;
means for translating the baseband design criteria into a binary rank criteria for modulated codes corresponding to the space-time codes; and
means for outputting the space-time codes according an algebraic framework derived from the binary rank criteria, wherein the binary rank criteria specifies that for every non-zero code word $c \in C$, $$\sum_{m=1}^{M} \text{rank}(c[m]) \geq d,$$

the rank is over a binary field F and d is the largest possible integer, the space-time code C achieving a diversity level of at least $dL_r$, $L_r$ being the number of the plurality of receive antennas, m representing the number of blocks per code word.

8. An apparatus according to claim 7, wherein the transmit diversity advantage is as follows:

$$d_m = \sum_{m=1}^{M} \text{rank}(f(c[m]) - f(e[m]))$$

over all pairs of distinct code words c, $e \in C$, m representing a fading block.

9. An apparatus according to claim 7, wherein the coding advantage is as follows:

$$\mu = \left( \prod_{m=1}^{M} \lambda_1[m]\lambda_2[m] \cdots \lambda_{d_m}[m] \right)^{1/d}$$

over all pairs of distinct code words c, $e \in C$, m representing a fading block, $\lambda_1[m]\lambda_2[m] \ldots \lambda_{d_m}[m]$ being nonzero eigenvalues of $(f(c[m])-f(e[m]))(f(c[m])-f(e[m]))^H$.

10. An apparatus according to claim 7, wherein the algebraic framework specifies C as a linear $L_t \times n$ space-time code, the space-time code being of dimension k including code word matrices, $$c = \begin{bmatrix} xM_1 \\ xM_2 \\ \vdots \\ xM_{L_t} \end{bmatrix}$$

wherein x denotes an arbitrary k-tuple of information bits and $n \geq L_t$, $M_1$, $M_2$, ..., $M_{L_t}$ are binary matrices of dimension $k \times n$, $n \leq k$, and $L_t$ represents the number of transmit antennas in the communication system.

11. An apparatus according to claim 10, wherein $M_1$, $M_2$, ..., $M_{L_t}$ has the following property, ∀$a_1, a_2, \ldots, a_{L_t} \in F$:

$M = a_1 M_1 \oplus a_2 M_2 \oplus \ldots \oplus a_{L_t} M_{L_t}$ is of full rank k unless $a_1 = a_2 = \ldots = a_{L_t} = 0$.
3
12. An apparatus according to claim 7, wherein the binary rank criteria specifies for every non-zero code word $c \in C$, at least one of $$\sum_{m=1}^{M} \text{rank}\{\Xi(c[m])\} \geq d, \text{ and } \sum_{m=1}^{M} \text{rank}\{\Psi(c[m])\} \geq d$$

holds true, wherein the rank is over a binary field and d is the largest possible integer, $\Xi$ being a row-based indicant projection, $\Psi$ being a column-based indicant projection, the space-time code C achieving a diversity level of at least $dL_r$, $L_r$ being the number of the plurality of receive antennas, m representing the number of blocks per code word.

13. A method for communicating over a communication system, the method comprising:

generating a code word in response to an input message, the code word being based upon a stacking construction generalized for a multi-input multi-output (MIMO) block fading channel, wherein the generalized stacking construction specifies C as a linear $L_t \times n$ space-time code, the space-time code being of dimension k including code word matrices, $$c = \begin{bmatrix} xM_1 \\ xM_2 \\ \vdots \\ xM_{L_t} \end{bmatrix}$$

wherein x denotes an arbitrary k-tuple of information bits and $n \geq L_t$, $M_1, M_2, \ldots, M_{L_t}$ are binary matrices of dimension $k \times n$, $n \leq k$, and $L_t$ represents the number of transmit antennas in the communication system; and transmitting the code word over a plurality of transmit antennas to a receiver configured to decode the code word using maximum likelihood decoding, wherein the receiver includes a plurality of receive antennas.

14. A method according to claim 13, further comprising:
modulating the code word based on either BPSK (binary phase-shift keying) modulation or QPSK (quadrature phase-shift keying) modulation.

15. A method according to claim 13, wherein the number of receive antennas is less than the number of transmit antennas.

* * * * *